No. 681,529. Patented Aug. 27, 1901.
W. A. CORNELIUS.
LUBRICATING DEVICE.
(Application filed Oct. 27, 1900.)
(No Model.)
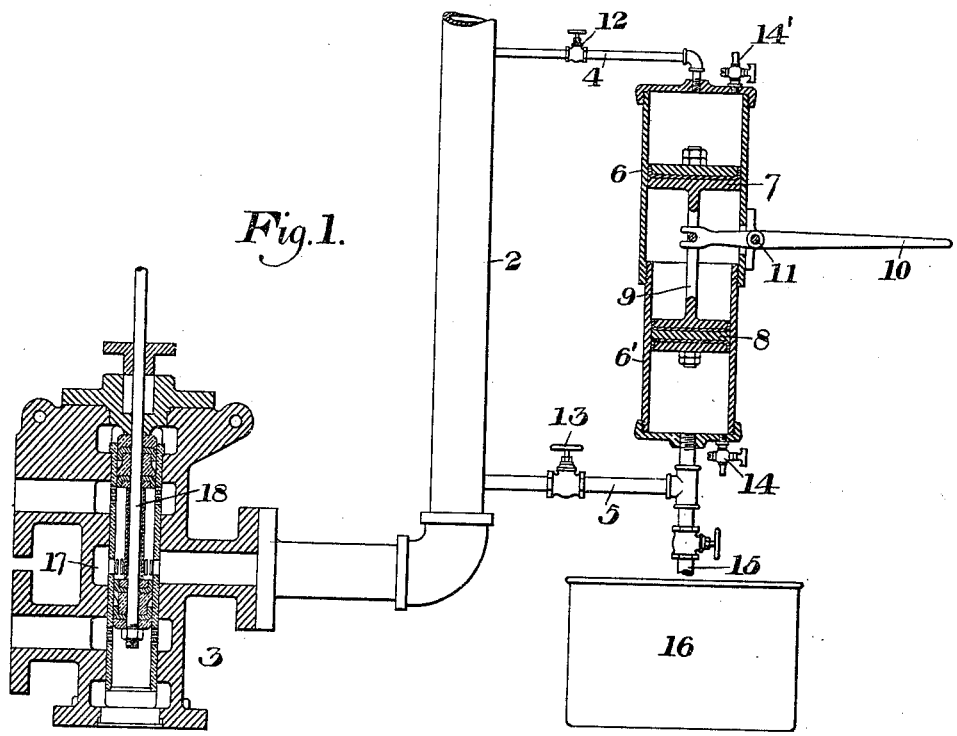
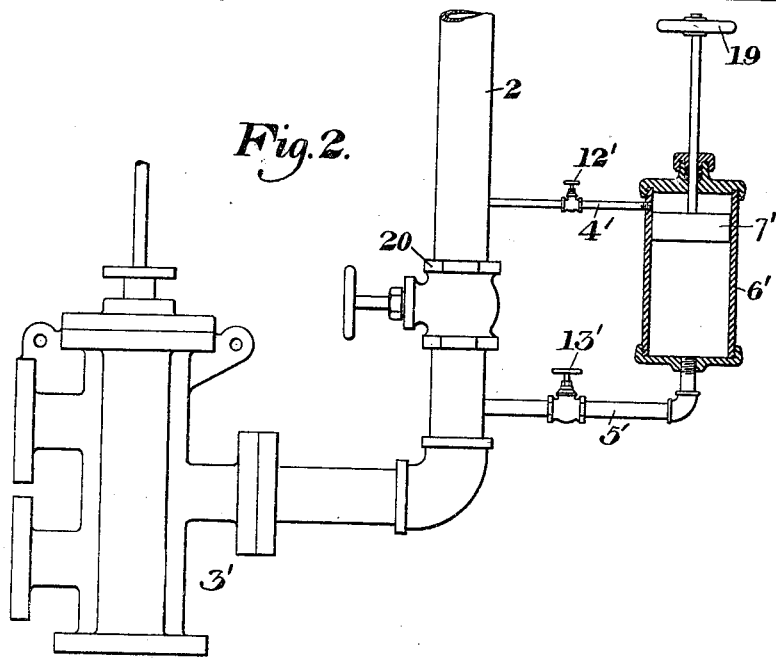
WITNESSES
INVENTOR
William A. Cornelius

UNITED STATES PATENT OFFICE.

WILLIAM A. CORNELIUS, OF HOMESTEAD, PENNSYLVANIA.

LUBRICATING DEVICE.

SPECIFICATION forming part of Letters Patent No. 681,529, dated August 27, 1901.

Application filed October 27, 1900. Serial No. 34,573. (No model.)

*To all whom it may concern:*

Be it known that I, WILLIAM A. CORNELIUS, of Homestead, in the county of Allegheny and State of Pennsylvania, have invented a new and useful Improvement in Lubricating Devices, of which the following is a full, clear, and exact description, reference being had to the accompanying drawings, forming part of this specification, in which—

Figure 1 is a sectional side elevation showing one form of my improved lubricating apparatus, and Fig. 2 is a similar view showing another and simpler form.

My invention relates to the lubricating of hydraulic valves and similar devices and is designed to provide an improved lubricating apparatus which will economize in the lubricant and obviate the necessity of shutting down the apparatus and taking the valves apart.

Heretofore where hydraulic valves have been employed in which a cylinder is used with ports leading through its sides in combination with the piston-valve arranged to connect or shut off communication between these ports in lubricating the valves, which operation must be carried out every few hours, it has been necessary to shut off the pressure, thus stopping the mill or machine controlled by such valve, then take the valve apart, cover the plunger with the lubricant, and replace the parts. This operation takes about half an hour, and as soon as the pressure is again turned on the major portion of the lubricant is at once washed through the outlet-port into the sewer at the first stroke of the valve. My invention overcomes these difficulties by supplying the lubricant to the water or other fluid under pressure supplied to the valve. This may be done without shutting off the valve and deposits the lubricant around the outside of the ports, so that it is not washed out rapidly, but is carried through a few globules at a time and lubricates the plunger as it passes the ports.

The invention consists in providing a lubricant-receptacle which is connected at or near its opposite ends by valved pipes to the main pressure-pipe leading to the valve or manifold, and, further, in providing one or more pistons or plungers within the cylinder or receptacle holding the lubricant, and which may be actuated either by pressure, by hand, or by mechanical connections to force the lubricant into the water or other fluid under pressure in the supply-pipe to the hydraulic valve.

It further consists in the construction and arrangement of the parts, as hereinafter more fully described, and set forth in the claims.

In the drawings, referring to the form of Fig. 1, 2 represents a hydraulic-pressure main leading to a hydraulic valve 3, which I have shown as of the well-known Critchlow type. From the pipe 2 branches 4 and 5 lead to the upper and lower ends, respectively, of a cylindrical lubricant-holder. This receptacle is formed of two cylinders 6 and 6' of different diameter containing the pistons 7 and 8, connected by the stems 9. These pistons are made of differential areas, the upper being slightly larger in diameter than the lower, and to their common stem is loosely connected a hand-lever 10, extending through the side of the receptacle and pivoted thereto at 11. The pipes 4 and 5 are provided with hand-valves 12 13', and in the heads of the cylinders 6 and 6' are provided exhaust-cocks 14 and 14'. The pipe 5 is provided with a T connection, from which a valve-controlled pipe 15 leads downwardly into a vessel 16, arranged to contain a supply of lubricant.

In operating the device the lower cylinder 6' is filled with lubricant, either by taking the receptacle apart and filling it by hand or by sucking the lubricant up through the pipe 15 by means of the hand-lever 10, the stop-cock 14' being open. After the lower cylinder is thus filled the valve of pipe 15 and exhaust-cock 14' are closed, the valve 13 of pipe 5 is opened the desired amount, and the valve 12 of pipe 4 is opened. Pressure thus being admitted above the upper piston 7 will force this piston down slowly, and thus force the lubricant through the outlet-pipe 5 into the pressure-main. The lubricant entering the water in the form of globules will be carried thereby into the annular passage 17 of the hydraulic valve, and thus be deposited in the slotted ports leading inwardly therefrom. As the plunger 18 of the valve is reciprocated the grease will thus lubricate it, and by suitably adjusting the pressure and the valve of pipe 5 the supply can be controlled as found desirable. After the lubricant is exhausted from the cylindrical reservoir the valves 12 and 13 are closed, the exhaust-cock 14' of the cylinder is opened, and the hand-lever 10 is then depressed to suck the lubricant up into the lower cylinder. The cock 14' is then closed, the valve of pipe 15 shut, and the valves 12 and 13 opened, as before. This form of my apparatus may be attached to the side of the valve itself or to the cylinder or other part containing fluid under pressure.

In the form of Fig. 2 I show a simpler device in which the pipes 4' and 5' lead to a cylinder 6', containing a plunger 7', whose stem extends upwardly through a suitable stuffing-box in the upper head and may be provided with a hand-wheel 19. In this form a valve 20 is provided in the pressure-main between the pipes 4' and 5', and in operating it the cylinder may be filled by removing the top head and piston, the valves 12' and 13' being closed. The parts then being replaced the lubricator-valve 20 is closed, valve 12' opened full, and valve 13' opened according to the amount of lubricant required, thus allowing the pressure (through valve 12') to force down the piston and drive the lubricant out into the pressure-main below the valve 20. The valves 12 and 13' are then closed and the valve 20 opened. The water then passing to the valve drives the lubricant into its ports to come in contact with the plunger, as before.

The advantages of my invention will be apparent to the users of hydraulic valves, since the long shut-down heretofore necessary is obviated, the apparatus of Fig. 1 allowing continuous use of the valve, while that of Fig. 2 requires only momentary stoppage.

The device may be attached to any part of a hydraulic-pressure pipe or channel leading to a valve, manifold, or other part containing fluid under pressure, and many variations may be made in the form and arrangement of the apparatus without departing from my invention.

I claim—

1. In a hydraulic-valve system, the combination with a hydraulic valve having a cylinder containing a manually-operated valve, and inlet-ports leading through the cylinder, of a hydraulic-pressure channel leading to said inlet-ports, a lubricating-reservoir having one end portion connected to said channel, an outlet connected to the other end portion of the reservoir, valves in each of said connections, and means for applying pressure to the lubricant to force it through one of said pipes and cause it to deposit in the inlet-ports in the cylinder; substantially as described.

2. In a hydraulic-valve system, the combination with a hydraulic valve, comprising a cylinder with series of side ports and a manually-operated valve arranged to cut off communication between said ports, of a hydraulic-pressure channel leading to the valve, a cylinder arranged to contain lubricant, valved pipes connecting the ends of the cylinder to the pressure-channel, a piston within the cylinder, and means for applying pressure to the piston to force the lubricant through the outlet; substantially as described.

3. In a hydraulic-valve system, the combination with a hydraulic valve, comprising a cylinder with series of side ports and a manually-operated valve arranged to cut off communication between said ports, of a hydraulic-pressure channel leading to the valve, a cylinder arranged to contain lubricant, and containing a piston, a valved outlet-pipe leading therefrom to the pressure-channel, and a valved inlet-pipe leading to the other side of the piston to supply pressure and force out the lubricant; substantially as described.

4. In a hydraulic-valve system, the combination with a hydraulic valve, comprising a cylinder with series of side ports and a manually-operated valve arranged to cut off communication between said ports, of a hydraulic-pressure channel leading to the valve, a cylinder arranged to contain lubricant, and having pipes leading from its ends into the pressure-channel, a piston within the cylinder, and means for unbalancing the piston to enable the pressure to force the lubricant out into the pressure-channel; substantially as described.

In testimony whereof I have hereunto set my hand.

WILLIAM A. CORNELIUS.

Witnesses:
W. H. CORBETT,
H. H. HERVEY.